United States Patent
Roxburgh

(10) Patent No.: US 9,170,910 B2
(45) Date of Patent: Oct. 27, 2015

(54) COMPLEX EVENT PROCESSING SYSTEM AND METHOD

(75) Inventor: David Roxburgh, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 424 days.

(21) Appl. No.: 13/638,451

(22) PCT Filed: Mar. 31, 2011

(86) PCT No.: PCT/GB2011/000503
§ 371 (c)(1),
(2), (4) Date: Sep. 28, 2012

(87) PCT Pub. No.: WO2011/121310
PCT Pub. Date: Oct. 6, 2011

(65) Prior Publication Data
US 2013/0031251 A1    Jan. 31, 2013

(30) Foreign Application Priority Data
Mar. 31, 2010 (EP) .................................. 10250698

(51) Int. Cl.
G06F 15/173 (2006.01)
G06F 11/30 (2006.01)
H04L 12/26 (2006.01)

(52) U.S. Cl.
CPC ........ *G06F 11/3006* (2013.01); *G06F 11/3072* (2013.01); *H04L 43/06* (2013.01); *H04L 43/10* (2013.01)

(58) Field of Classification Search
USPC ................................................ 709/224, 220
See application file for complete search history.

(56) References Cited

U.S. PATENT DOCUMENTS

| 7,617,525 B1 | 11/2009 | Moeck et al. |
| 2006/0229923 A1* | 10/2006 | Adi et al. ........................ 705/8 |
| 2007/0255529 A1 | 11/2007 | Biazetti et al. |
| 2007/0260569 A1 | 11/2007 | Biger et al. |

(Continued)

OTHER PUBLICATIONS

International Search Report for PCT/GB2011/000503, mailed May 26, 2011.

*Primary Examiner* — Philip B Tran
(74) *Attorney, Agent, or Firm* — Nixon & Vanderhye P.C.

(57) ABSTRACT

A complex event processing system comprises a complex event processing engine (52) and an event harvesting system, wherein the event harvesting system is operable to monitor a computer network (10, 21, 22, 31, 32, 33), generate simple event reports in response to the result of monitoring the network and pass these to the complex event processing engine for processing. The event harvesting system comprises a central configuration control module (51, 53) and a plurality of capture node modules (41, 42) each of which is operatively connected to the central configuration control module. Each capture node module is operable to receive configuration instructions from the central configuration control module to determine what simple event reports are to be generated by the module and in response to what conditions detected on the monitored computer network. The central configuration control module includes an interface (51) in the form of a web server for receiving configuration instructions from a user of the system and for processing these configuration instructions and sending them to a specified capture node module for causing the module to operate in accordance with the specified configuration instructions.

13 Claims, 4 Drawing Sheets

(56) References Cited

U.S. PATENT DOCUMENTS

| | | |
|---|---|---|
| 2008/0109824 A1 | 5/2008 | Chen et al. |
| 2008/0189352 A1 | 8/2008 | Mitchell et al. |
| 2009/0271468 A1* | 10/2009 | DiStefano ..................... 709/201 |
| 2010/0125584 A1* | 5/2010 | Navas ........................... 707/747 |

* cited by examiner

COMPLEX EVENT PROCESSING SYSTEM AND METHOD

This application is the U.S. national phase of International Application No. PCT/GB2011/000503, filed 31 Mar. 2011, which designated the U.S. and claims priority to EP Application No. 10250698.7, filed 31 Mar. 2010, the entire contents of each of which are hereby incorporated by reference.

FIELD OF THE INVENTION

The present invention relates to a Complex Event Processing (CEP) system and method. CEP systems are used to identify the occurrence of complex events which typically must be inferred by detecting patterns in the occurrence of plural simple events.

BACKGROUND TO THE INVENTION

Over time, the Information Technology (IT) systems of organisations have often grown in an organic way so as to incorporate many different heterogeneous (legacy) IT components (e.g. databases, applications, servers, etc.). Many attempts have been made to integrate these heterogeneous systems into a fully integrated system.

For example, U.S. Pat. No. 7,130,812 describes a system for capturing information from multiple heterogeneous systems and storing this in a single centralised database for analysis and review by (human) users of the system.

Complex Event Processing

Complex Event Processing (CEP) systems are systems which seek to determine when a complex event has occurred based on the detected occurrence of a (typically much) larger number of simple events. There has been a large amount of research into CEP systems and sophisticated CEP engines have been developed such as that described in US 2007/0260569, in which input simple events are stored in memory such that if a rule for identifying a complex event (referred to as a situation in US 2007/0260569) is modified, it can be applied instantly even to situations which may have started occurring even before the new rule definition was known to the CEP engine.

US 2007/255529, US 2008/109824 and US 2008/189352 all describe CEP engines but none of them considers in any great depth the manner in which simple events can be harvested from a legacy system in a way which does not require significant modifications to the systems from which the events are derived and therefore none of these documents presents a solution that would be readily applicable to a typical legacy system in which great care needs to be exercised before modifying the legacy system, in particular modifying the types of inputs which legacy applications receive or the types of outputs which legacy applications need to produce.

Most previous research (including for example US 2007/0260569, US 2007/255529, US 2008/109824 and US 2008/189352) has not considered in any great detail how simple events to form the input to a CEP engine should be harvested from a system whose behaviour is to be monitored by the CEP system. In general it has simply been assumed that the system to be monitored will already produce interesting events and that these will be easy to expose to the CEP system (possibly after some pre-processing as in US 2007/0260569). However, the present inventor has determined that this is not in fact the case and that it is generally not in fact trivial to harvest useful simple events, especially from a legacy system which is still being used in a commercially critical environment.

SUMMARY OF THE INVENTION

According to a first aspect of the present invention, there is provided a complex event processing system comprising a complex event processing engine and an event harvesting system, wherein the event harvesting system is operable to monitor a computer network, generate simple event reports in response to the result of monitoring the network and pass these to the complex event processing engine for processing, wherein the event harvesting system comprises:
  a central configuration control module; and
  a plurality of capture node modules each of which is operatively connected to the central configuration control module; wherein
  each capture node module is operable to receive configuration instructions from the central configuration control module to determine what simple event reports are to be generated by the module and in response to what conditions detected on the monitored computer network, and wherein
  the central configuration control module includes an interface for receiving configuration instructions from a user of the system and for processing these configuration instructions and sending them to a specified capture node module for causing the module to operate in accordance with the specified configuration instructions.

Preferably each of the capture node modules is configurable to operate in a non-invasive manner. Preferably, each of the capture node modules is configurable to operate in at least either of the following two non-invasive modes: as a packet sniffer or as a log file sniffer. In this way, it is relatively straightforward to deploy capture node modules onto a legacy system. Because they can be configured to operate in a non-invasive manner, the capture nodes can still be deployed in places where an invasive capture node module (e.g. one which makes active requests for data from legacy applications and requires therefore active responses from the legacy application) would be unacceptable. Because they are configurable after deployment in away which does not impact on the operation of the legacy system, it is straightforward to deploy the capture node modules during a deployment phase without having to be so cautious as might normally be expected in terms of assessing the possible impacts of such deployment if the capture nodes were invasive in the sense that they had some impact on the operation of the legacy system. Only if the administrator is unable to obtain sufficient simple events to detect all desired complex events using non-invasive configurations of the capture nodes will the administrator need to consider the possibility of using somewhat invasive configurations of some of the deployed capture nodes and these can be chosen carefully in such a way as to minimise the risk to the legacy system as a whole.

Preferably, at least some of the capture node modules operate non-invasively to detect conditions which occur independently of the event harvesting system.

A system according to this aspect of the present invention has the significant advantage that it is able to be easily implemented on an existing legacy system even if it contains heterogeneous system components. By contrast with the system in U.S. Pat. No. 7,130,812, for example, by using a Complex Event Processing (CEP) system, it is possible to extract useful information from events which occur independently of the monitoring system (i.e. the event harvesting system of the present invention). By contrast, in U.S. Pat. No. 7,130,812 the monitoring system needs to be set up to make specific enquiries from the (legacy) system components which it is monitoring. This requires the (legacy) system which is being monitored to change its behaviour to some extent at least (when compared with how it would behave if it were not being monitored). This introduces risks of the system changing its behaviour in an adverse way and may introduce security risks, etc. For example, it may be necessary to set up special accounts for use by the monitoring system in order to be able to access the legacy data sources (e.g. databases), and the requests made to the legacy systems for data could inadvertently result in the data being stored by those systems being corrupted in some way if an inappropriate "request" were made to the system, etc.

The term computer network is intended to cover not merely the network devices which act to connect different systems together, but also the systems which are connected together. Thus it includes databases and server computers (including the applications running thereon) as well as router devices, etc. Thus monitoring the network can include reading information stored on a server computer (e.g. a log of data generated by a particular application) or reading data transmitted over the network in transit between two or more devices of the network.

The term Complex Event Processing (CEP) engine is used to refer to a device which is operable to infer the occurrence of complex conditions based on the detection of combinations of occurrences of plural simple events, the occurrence of each simple event being detectable based on the data captured by a single capture node, and preferably where the occurrence of a complex condition is not detectable solely on the basis of the data captured by a single capture node, or is only detectable based on data captured by a single capture node using statistical analysis over a time period. In other words, a CEP engine is one which is able to infer the occurrence of a complex event based on the detection of the occurrence of plural simple events, the occurrence of each simple event being detectable based on the data captured by a single capture node, and preferably where the occurrence of a complex event is not detectable solely on the basis of the data captured by a single capture node, or is only detectable based on data captured by a single capture node at distinct periods of time and/or with the help of statistical analysis of data from the single capture node over a period of time greater than the duration of time required to detect the occurrence of a single simple event. An example of a suitable CEP engine which could be used for this purpose is the well-known open source CEP engine "ESPER" (see http://esper.codehaus.org/ and associated printed publications for more details about ESPER).

Preferably, each capture node module is a generic module capable of being configured into one of the following specific types of capture node: a network sniffer operable to observe packets of data flowing on a network or a log picker operable to read log files and extract information from those. Preferably, the generic capture node module is further configurable into a messaging service topic consumer which is operable to receive copies of messages posted by applications to a messaging service server such as a Java Message Service (JMS) server.

Each capture node may be further configurable into one or more minimally invasive capture nodes for use in conjunction with the non-invasive capture nodes. Such a minimally invasive capture node might be an HTTP Getter node operable to request and receive web-pages or other data obtainable using a Hyper Text Transfer Protocol (HTTP) request, or a messaging service client for a messaging system in which only a single client may consume a single message. Concerning this latter case, it should be noted that messaging services can generally be categorised as subscribing to either the publish and subscribe model or the point-to-point or queuing model. Some messaging services, such as the JMS, can operate in either manner. For systems using a publish/subscribe approach, naturally a fully non-invasive capture node can be used which simply subscribes to all messages which the administrator would like the CEP engine to have visibility of (this is the capture node referred to above as a messaging service topic consumer—furthermore, this approach can be extended to any kind of notification system where the capture node can be simply registered as a "listener" so as to automatically receive information or messages about events occurring, etc for which the node has been registered as a "listener").

However, for systems using a point-to-point messaging service, a capture node could be configured to a minimally-invasive message consumer in which the legacy application is re-configured to send duplicate messages to the capture node as well as to the original destination, for all messages of which the administrator would like the CEP engine to have visibility. Note that since messaging services such as JMS are relatively recent developments, the original adaptation of the legacy application to be able to use such a messaging service will have been the hardest part. The change required to have the application produce duplicate messages for consumption by the capture node should in most cases be fairly trivial. Furthermore, in such a case where a legacy application has been adapted for use with a new messaging service for interoperation purposes, the application will not be being required to generate any additional data (in terms of the data generated by the application itself and which the application—whatever it is—was originally intended to generate which might be a hard thing to achieve) but merely to change the way in which that data is output using a new technology to which it has (already) been subsequently adapted—which should be relatively straightforward and may merely involve amending the configuration of the messaging service rather than the legacy application.

It is generally preferred that at least some of the capture node modules should be non-invasive, while others may be minimally invasive. However, in some cases it may be preferable that all of the capture node modules should operate in a non-invasive manner.

Preferably, the capture node modules are generic in terms of their software so that they are easily configured by the central configuration control module (which may hereinafter be referred to as a head end node) but they may be deployed either on stand alone hardware (e.g. a simple computer running any standard operating system such as, for example, a version of the Linux operating system) and then connected to the network (e.g. via a spare Ethernet port on an Ethernet hub) or they may simply be the code deployed as an application running on an already existent piece of hardware (e.g. a server computer running on the network). The capture node modules are preferably dynamically configurable and also re-configurable by the head end after they have been deployed. This assists not only with making deployment much easier than where the capture nodes need to be locally configured prior to deployment, but also by making maintenance of the system post deployment much easier.

Preferably, the capture node modules and the head end node include a heartbeat mechanism whereby each active deployed capture node periodically communicates with the head end node even where no simple event occurrences have been detected by the capture node module, to provide a level of assurance to the head end node that the capture node is still operating correctly. This is a key aspect in making the system reliable.

Preferably, the head end node incorporates a listener module. The listener module is operable to receive registration requests by external components. Any external component which registers with the listener module for notification of the occurrence of a particular (complex) event as detected by the CEP engine, will be duly notified by the listener module whenever such an occurrence is actually detected by the CEP engine. This greatly eases the integration of the present system into a legacy system since it is straightforward for a particular component to receive notifications only about events with which it is interested, the correct notification of the correct component being handled automatically by the listener module. It also makes it easy to reuse the invention by ensuring that the 'plumbing' (i.e. the internal components being used to generate appropriate notifications from simple events occurring somewhere on the legacy network) is all tried and tested.

According to a second aspect of the present invention, there is provided a method of detecting the occurrence of complex events on a network, the method comprising:
 deploying a central configuration control module and a plurality of capture node modules each of which is operatively connected to the central configuration control module onto a legacy network to be monitored;
 transmitting configuration instructions from the central configuration control module to each capture node module to specify what simple event reports are to be generated by the capture node module and in response to what conditions detected on the monitored computer network;
 transmitting to the central configuration control module configuration instructions from a user of the system;
 processing these configuration instructions; and
 sending them to a specified capture node module for causing the module to operate in accordance with the specified configuration instructions; wherein
 the capture node modules monitor the computer network to generate simple event reports in response to the result of monitoring the network and pass these to a complex event processing engine associated with the central configuration module for processing to identify the occurrence of complex events based on the received simple event reports.

The present invention further relates to computer programs for carrying out the method of the second aspect of the present invention and to carrier means, most preferably tangible carrier means such as a magnetic or optical disk (e.g. a hard drive or a CD ROM or DVD, etc.), or disks, or a solid state memory device (e.g. a "usb thumb drive"), or devices, carrying such programs.

BRIEF DESCRIPTION OF THE DRAWINGS

In order that the present invention may be better understood, embodiments thereof will now be described, by way of example only, with reference to the accompanying drawings in which.

DETAILED DESCRIPTION

Figure 1:
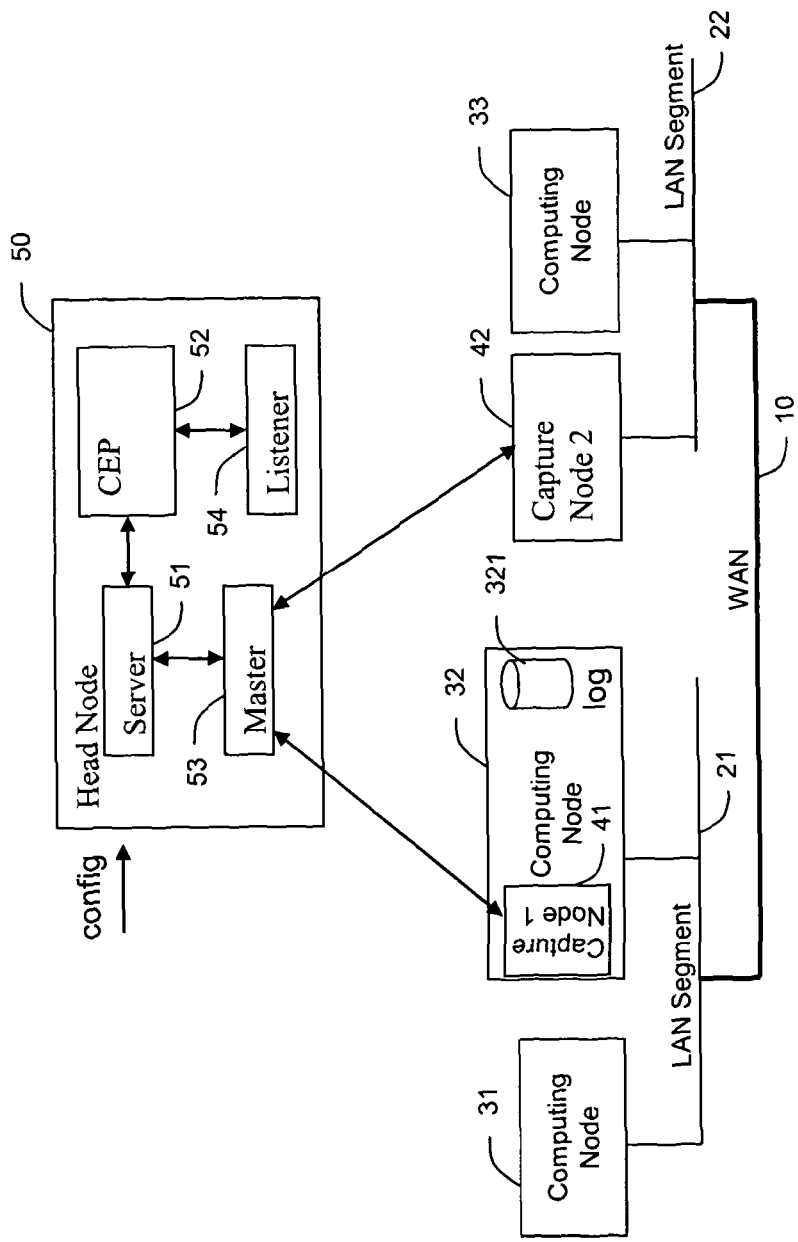
FIG. 1 is a schematic overview of a computer network incorporating a complex event processing system according to an embodiment of the present invention.

FIG. 1 schematically illustrates an embodiment of the present invention. As shown, there is a Wide Area Network (WAN) 10 which connects together two Local Area Network (LAN) segments 21,22, with a first 31 and second 32 computing node being connected to the first LAN segment 21 and a third computing node 33 being connected to the second LAN segment 22. Each computing node can be any kind of computing device from a large server computer to a small measuring device, provided it is able to communicate over the LAN segment to which it is attached. The second computing node 32 in this example is considered to be a server computer which stores a log-file 321 (amongst many other things naturally, although these are not shown since they are not pertinent to the present invention).

In addition to the above described conventional elements of the computer network, FIG. 1 also illustrates a complex event processing system comprising a first 41 and a second 42 capture node and a head end node (or central configuration control module) 50. As shown, the Head end node 50 includes a server module 51, a Complex Event Processing module/engine 52, a master module 53 and a listener module 54.

The server module 51 (e.g. a web server) is responsible for receiving configuration instructions from a user and forwarding the capture node configuration instructions to the respective capture node (and thus behaves as an interface for receiving configuration instructions from a user). Additionally, it is responsible for forwarding received simple event reports from the capture nodes to the CEP engine 52 (although this latter task could be performed by the master module 53 as well as or instead of the server)). The server module may be formed on the basis of a well known server program such as the Apache server program.

The CEP engine 52 is responsible for receiving suitably formatted simple event reports originating from the capture nodes and to process these to identify the occurrence of complex events based on some sort of pattern spotting or analysis of the received simple event reports. In the present embodiment, the CEP engine is formed using the ESPER program. When the CEP engine determines that it has detected the occurrence of a complex event, it generates s report which is provided to the listener module 54.

The Listener module 54 distributes any reports which it receives from the CEP engine 52 to any external components which have registered with the listener module 54 to receive any such reports. This type of event handling/messaging service is well known and understood. In the present embodiment, it is implemented using Java event handling by which classes can implement Listener interfaces to be made aware of particular Java Events for which a Listener is registered. An alternative approach would be to use a messaging service such as Java Message Service (JMS).

The master module 53 is responsible for maintaining a heartbeat communication with each of the deployed capture nodes 41, 42. This is simply a regular two-way communication between the master module and each capture node which provides a strong level of assurance that all of the components of the CEP system are functioning correctly and still able to communicate correctly with one another. In the present embodiment, the period between sending heartbeats may be configured by a user such that more critical capture nodes can be given a higher frequency heartbeat rate such that any problems with these nodes will be detected more quickly than for less critical nodes, etc. The master module may additionally receive the simple event reports and pass these on either directly to the CEP engine or to the CEP engine via the server module.

Figure 2:
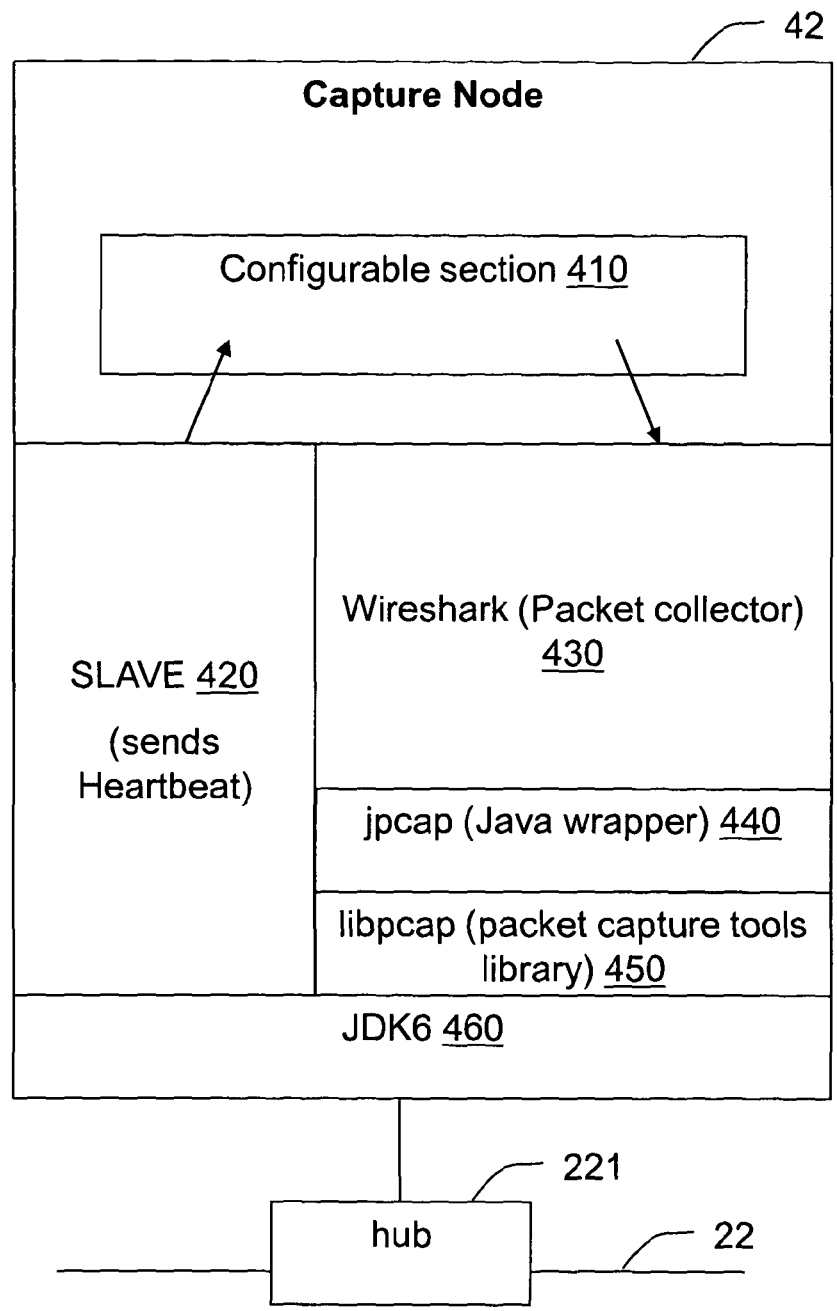
FIG. 2 is a schematic overview of one of the capture node modules shown in FIG. 1, showing the capture node module in more detail.

It can be seen form FIG. 1 that the capture nodes of the present embodiment may take different forms—in particular, the first capture node 41 is illustrated as being contained within the computing node 32, whilst the second capture node 42 is illustrated as being a stand alone device. It will be appreciated by a person skilled in the art that there need be little significant functional difference between such capture nodes despite these differences. In the case of the first capture node 41, it is simply installed by an administrator of the computing node 32 on which it resides, and set to run on a continual basis under the control of whatever operating system is controlling the computing node. Preferably, the capture node is a Java program and so is portable to any device provided it is able to run Java programs. Furthermore, the inherent security provided by the Java programming language means that it is straightforward to configure the program such that it cannot compromise the security of the device upon which it is running, even though it is adapted to be configured by a remote device. The case of the second capture node is basically remarkably similar, except that it is set to run on a dedicated piece of hardware. Again it is a java program running on a computer under the control of an operating system (e.g. a Linux operating system). The device needs to be connected to the LAN. As shown in FIG. 2, this can be done by connecting the device to a hub 221 on the LAN 22 via any spare port on the hub.

Turning now to FIG. 2, the capture node 42 of the present embodiment is shown in greater detail. As shown, it includes a configurable section/module 410, a slave module 420, a Wireshark (Packet Collector) module 430, the jpcap Java wrapper 440, the libpcap (packet capture tools) library 450 and the Java Development Kit version 6 (JDK6) 460. The JDK6 provides a set of standard code libraries, tools and functions which Java programs are able to use. The libpcap provides a code library to provide specific functions relating to capturing packets off an Ethernet network, and the jpcap provides a Java wrapper to the libpcap which permits Java programs to uses the functionality provided by the libpcap library. The Wireshark module is a well known packet collector program which is used in the present embodiment to perform packet sniffing and other packet processing functions; it is a Java program which uses the libpcap library of functions via the jpcap wrapper. The slave module is responsible for maintaining the heartbeat communications with the master module 53 of the head node 50. Finally, the configurable section is responsible for overall control of the capture node using the services provided by the other components. In particular, it is operable to receive configuration instructions from the head node 50 and to ensure that these are correctly implemented in the capture node and to ensure that simple event reports are generated when appropriate as determined by the configuration instructions and duly sent to the head node 50. Configuration examples are described in greater detail below with reference to a specific example deployment.

Fuel Storage Tank Network Example

Figure 3:
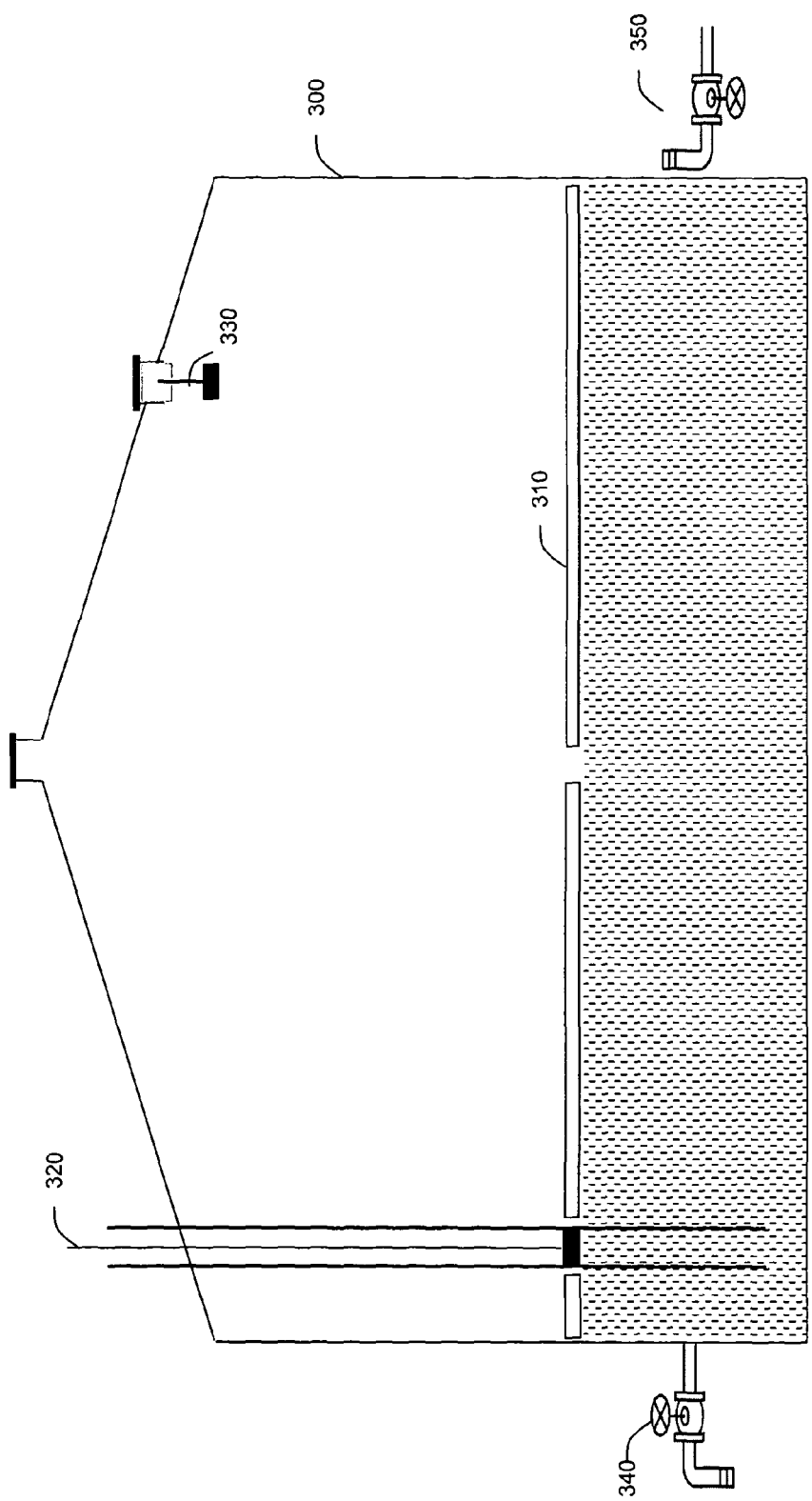
FIG. 3 is a schematic illustration of a fuel storage tank forming part of an example computer network system to which the complex event processing system of FIG. 1 may be applied.
Figure 4:
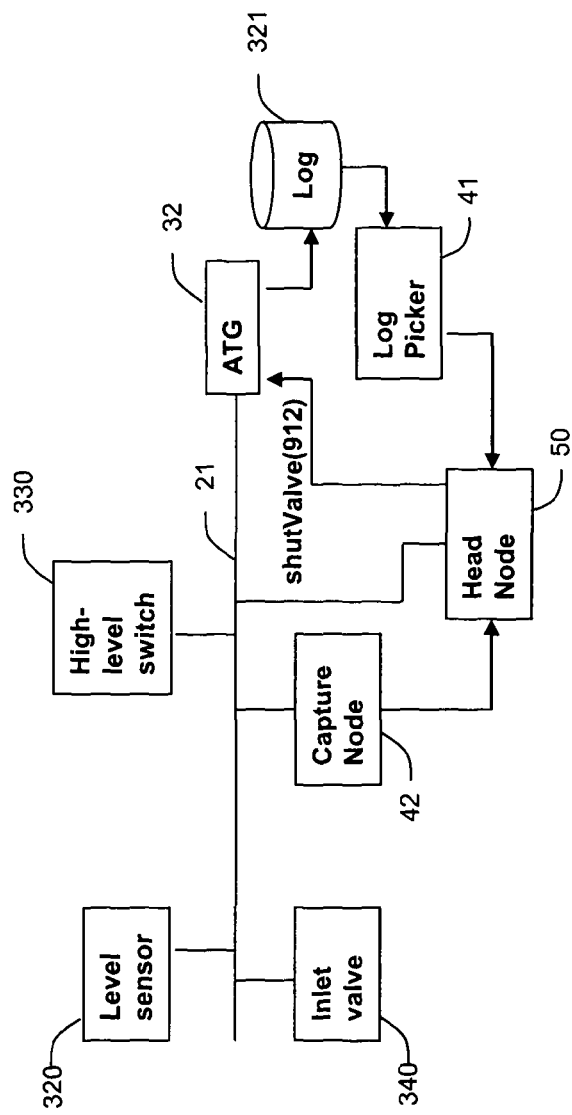
FIG. 4 is a schematic illustration of the computer network containing the fuel storage tank of FIG. 3 and the complex event processing system of FIG. 1 illustrating an example deployment of an embodiment of the present invention.

FIG. 3 is a schematic illustration of a Fuel Tank which is monitored and controlled by a computer network which is illustrated schematically in FIG. 4.

As shown in FIG. 3, the fuel tank 300 includes a floating platform which floats on top of the fuel contained in the tank. It also includes an inlet valve 34, and an outlet valve 350. The inlet valve 340 is operable to report its status (i.e. open or closed) onto the Local Area Network (LAN) segment 21 (shown in FIG. 4). The fuel tank 300 further includes a level sensor 320 which is also operable to report it's reading onto the LAN 21. Finally, there is also a High-level switch 330 which is also operable to report its status (as being either off or inactivated normal safe position or activated indicative of the floating platform having reached a dangerously high level) onto the LAN 21.

If the tank is overfilled to a height above that at which the High-level switch is activated, the fuel tank enters a dangerous condition in which an explosion may occur (e.g. as occurred in Buncefield, Hemel Hempstead in December 2005). To prevent this occurring, an Automatic Tank Gauging (ATG) system 32 (see FIG. 4) monitors the status of the level switch and closes the inlet valve if the level switch exceeds a certain height measurement at which the tank is considered to be full. The High-level switch 330 acts as a backup and the ATG will also close the inlet valve if this switch is activated, regardless of the reading given by the level sensor, in case the level sensor fails. However, since both sensors (the level sensor and the High level switch) may very occasionally fail at the same time (as is believed to have occurred at Buncefield in 2005) the present example further reemploys the CEP system of the present embodiment.

Thus, referring now to FIG. 4, the computer network includes (in addition to the level sensor 320, the inlet valve 340, the High-level switch 330 and the ATG system 32 (which maintains a log 321)) a head node 50 and two capture nodes 41 and 42. The first capture node 41 is configured as a log-Picker and runs on the ATG system in the present example. The second capture node 42 is configured as a network sniffer (netSniffer) and runs on its own dedicated hardware which is connected to the LAN 21 via a spare port (i.e. socket) on a hub connected to the LAN 21. The Head node is configured (as explained below) such that the CEP engine will detect if a complex event is occurring whereby the inlet valve is open but the level is not increasing. Since the inlet valve should only be open if fuel is being input into the tank, if the inlet valve is open and the level is not increasing, something is going wrong (either the level sensor has failed or no fuel is going into the tank (e.g. because filling has finished)—in either case the safe action to take is to close the inlet valve). The ATG 32 has registered with the listener of the head node to be informed of such events occurring and so will receive a report indicated as the shutValve(912) signal since it would cause the ATG to close inlet valve 340 (the 912 refers to the identification number of the fuel tank 300 in the present embodiment since there may be many different fuel tanks controlled by a single ATG system).

In order to configure the head and the two capture nodes, three text configuration files and a Java class are provided by a user to the head node 50 as follows:

head.cfg
01: capture_nodes=2
02: hb_count_period=4
03:
04: capture_node1_host=10.0.0.57
05: capture_node1_port=3045

-continued

```
06:
07: capture_node2_host=10.0.0.148
08: capture_node2_port=3045
09:
10: CEPStmts = 3
11:
12: CEPStmt1= create variable boolean var_in_valve_open = false
13: CEPStmt2= on ATG_log (valve='in valve') set
var_in_valve_open = (position='opened')
14:
15: CEPStmt3= select (level) from LevelData where (var_in_valve_open
and level − (select prior(1, level) from LevelData.std:lastevent( )) < 300)
16:
17: CEPStmt3_listener= com.bt.BICI.ATGListener
capture node1.cfg
01: module_type = logPicker
02:
03: log_directory = /root/workspace/ATG
04: log_filename = ATG.log
05:
06: capture_regex = .*902 '((in)|(out)) valve ((opened)|(closed))'\.
07: field_regex_count = 3
08: field_regex_1 = [0-9]+ [a-z,A-Z]+ [0-9]+ [0-9]+:[0-9]+:[0-9]+\.[0-9]+
09: field_name_1 = time
10: field_regex_2 = (in valve|out valve)
11: field_name_2 = valve
12: field_regex_3 = (opened|closed)
13: field_name_3 = position
14:
15: sleep = 50
16: HBPeriod = 3000
capture node2.cfg
01: module_type = netSniffer
02:
03: device_index = 0
04: capture_filter = ip and tcp && src host 10.0.0.37 && dst port 4005
05:
06: tcpBufferSize = 200000
07:
09: HBPeriod = 3000
ATGListener
public class ATGListener implements UpdateListener {
   Calendar lastEventTS;
   public ATGListener( ) {
      super( );
      lastEventTS = Calendar.getInstance( );
   }
   public void update(EventBean[ ] newEvents, EventBean[ ] oldEvents) {
      String cat;
      for (int i=0; i<newEvents.length; i++) {
         System.out.println(((Calendar.getInstance( ).getTimeInMillis( )−
               lastEventTS.getTimeInMillis( ) > 1500)?
            "INFO":"ALERT")+
            ": ATG invalve open, anomalous fill-rate (level = "+
                  newEvents[i].get("level")+")"));
         lastEventTS = Calendar.getInstance( );
      }
   }
}
```

Referring firstly to the first text configuration file head.cfg, because at line 01 it is specified that capture_nodes=2, the head node 50 looks for two capture node configuration files called capture_nodetcfg and capture_node2.cfg and sends these directly to the capture nodes at the network addresses and ports given in lines 04&05 and 07&08 (note that the Head node 50 does not make any direct use of these files itself, it just transparently forwards them to the respective capture nodes—before it sends them, however, it adds a line specifying the port on which the capture node is to send back its events—the port on which the master thread (associated with the master module 53), which is allocated to the particular capture node, will be listening—the network address of the head node will be known to the capture node from the connection established in order to send the configuration file).

The remainder of the head.cfg file is used to configure the CEP engine 52 with Event Processing Commands, and these are discussed in greater detail below. The operation of the system of head and capture nodes as configured by files such as specified above is to collect simple event data reports, extract event fields from these, name them, compile them into the required format and return them to the CEP engine such tht the CEP engine and the listener can make sense of them.

Referring to capture_nodetcfg this file specifies (in line 01) that the capture node is to be a logPicker type node, the location of the log to monitor (in lines 03 and 04), and that when a line of interest is added to the log file, it should extract fields from that line and transform them into the correct eXtensible Markup Language (XML) format for subsequent injection into the CEP engine. An example set of lines form the log file 321 being monitored is set out below:

| ATG logfile |
|---|
| 01: 08/03/09 12:09:07 Tank 902 level 2042 |
| 02: 08/03/09 12:09:10 Tank 902 in valve opened |
| 03: 08/03/09 12:10:10 Tank 902 level 2053 |
| 04: 08/03/09 12:11:15 Tank 902 level 2066 |
| 05: 08/03/09 12:12:17 Tank 902 level 2077 |
| 06: 08/03/09 12:12:30 Tank 902 in valve closed |
| 07: 08/03/09 12:13:21 Tank 902 level 2080 |

In capture_nodetcfg, capture_regex (a regular expression filter) causes the Capture Node to capture lines 02 and 06 of the log file. However, the CEP engine cannot make any sense of these lines as they are—they must be transformed into XML. Once captured, the field_regex_# values are used to extract the fields of importance (the time, the valve name and the valve's position). The field_name_# values are used to name those fields 'time', 'position' and 'valve', respectively (in the above "#" refers to any number).

The Capture Node then compiles the XML required for ingestion by the CEP engine. The configuration causes the following XML to be generated in response to line 02 of the log file:

| XML |
|---|
| <?xml version "1.0" encoding="ISO-8859-1" standalone="yes"?> |
| <logEvent> |
|    <time>08/03/09 12:09:10</time> |
|    <valve>in valve</valve> |
|    <position>opened</position> |
| </logEvent> |

This XML is then sent directly to the Head Node which injects it into the CEP engine.

So the Capture Node configuration defines how the Capture Node should run (as a Log Picker rather than a Network Sniffer for example), what to monitor (the path to the logfile), what lines to capture (those which match capture_regex), what fields to extract from each captured line (those fields matching field_regex_#), what to name them (field_name_#) in the generated XML and the IP/port address to send the generated XML to (the IP address from which the Head Node sent the original configuration and the port number included in that configuration by the head node before sending to the capture node).

Reconsidering now the Head Node configuration (head-.cfg), it can be seen that lines 10 to 15 specify the Event Processing Language (EPL) statements with which the CEP engine should be configured. The event parameter names in line 13 (valve, position) are derived from the field_name_# settings in the Capture Node configuration file capture_node1.cfg.

Line 17 specifies a Java class to receive matched events (this basically configures the listener—in the present embodiment, the head node implements the ATG Listener interface; in the code quoted above for illustration only this simply causes a warning to be printed out by the system—however in practice when implemented this code is changed to cause a message to be sent to the ATG system32 which would be specific to the appropriate address for the ATG system—e.g. the consumer id of the ATG system if a JMS system is employed, etc.). As for writing the EPL statement on line 13 of head.cfg, writing, testing and maintaining the Listener class is made easier by the fact that the system automates the capture, filtering, transformation and up-stream transmission and routing of events including configurable naming of event parameters.

Variations

In the above described embodiment, only configuration text files are transmitted to the capture nodes. It is possible to reconfigure capture nodes after initial deployment by simply sending a new configuration file. However, since it may be desirable for a capture node to be reconfigured after the initial deployment, it is possible in alternative embodiments to allow for developments which have occurred post deployment of the capture nodes which require additional functionality which cannot be achieved merely by configuration. In such a case alternative embodiments may permit new software to be sent by the head node to the capture nodes (e.g. in the form of new Java classes—probably in byte code form most conveniently) to provide new functionality to the capture nodes in addition to new configuration files (which can then take advantage of such new functionality).

The invention claimed is:

1. A complex event processing system comprising a complex event processing engine and an event harvesting system, wherein the event harvesting system is operable to monitor a computer network, generate simple event reports in response to the result of monitoring the network and pass these to the complex event processing engine for processing, wherein the event harvesting system comprises:
   a head end node; and
   a plurality of capture nodes each of which is operatively connected to the head end node; wherein:
   the head end node includes computer hardware for performing central configuration control of the plurality of capture nodes;
   each capture node is operable to receive configuration instructions from the head end node to determine what simple event reports are to be generated by the capture node and in response to what conditions detected on the monitored computer network;
   the head end node includes an interface for receiving configuration instructions from a user of the system and for processing these configuration instructions and sending them to a specified capture node for causing the specified capture node to operate in accordance with the specified configuration instructions; and
   one or more of the capture nodes is configurable into a plurality of different configurations including a non-invasive mode of operation configuration and an invasive or minimally invasive mode of operation configuration.

2. The system according to claim 1 wherein the complex event processing engine is operable to infer the occurrence of complex conditions based on the detection of combinations of occurrences of plural simple events, the occurrence of each simple event being detectable based on the data captured by a single capture node.

3. The system according to claim 2 wherein the complex event processing engine is operable to detect the occurrence of complex conditions which are not detectable solely on the basis of the data captured by a single capture node, or which are only detectable based on data captured by a single capture node using statistical analysis over a time period.

4. The system according to claim 1 wherein each capture node is a generic node capable of being configured into one of the following specific types of capture node: a network sniffer operable to extract information from packets of data flowing on a network or a log picker operable to extract information from log files.

5. The system according to claim 1 wherein the capture nodes and the head end node include a heartbeat mechanism whereby each active deployed capture node periodically communicates with the head end node even where no simple event occurrences have been detected by the capture node, to provide a level of assurance to the head end node that the capture node is still operating correctly.

6. The system according to claim 1 wherein the head end node is configured to receive registration requests by external components whereby any external component which registers with the head end node for notification of the occurrence of a particular complex event as detected by the complex event processing engine, is notified by the head end node whenever such an occurrence is actually detected by the CEP engine.

7. A method of detecting the occurrence of complex events on a network, the method comprising:
   deploying a head end node and a plurality of capture nodes each of which is operatively connected to the head end node onto a legacy network to be monitored, the head end node including computer hardware for performing central configuration control of the plurality of capture nodes;
   transmitting configuration instructions from the head end node to each capture node to specify what simple event reports are to be generated by the capture node and in response to what conditions detected on the monitored computer network;
   transmitting to the head end node configuration instructions from a user of the system;
   processing these configuration instructions; and
   sending them to a specified capture node for causing the specified capture node to operate in accordance with the specified configuration instructions; wherein:
   the capture nodes monitor the computer network to generate simple event reports in response to the result of monitoring the network and pass these to a complex event processing engine associated with the head end node for processing to identify the occurrence of complex events based on the received simple event reports; and
   one or more of the capture nodes is configurable into a plurality of different configurations including a non-invasive mode of operation configuration and an invasive or minimally invasive mode of operation configuration.

8. A non-transitory machine readable storage medium carrying processor implementable instructions for causing a processor or processors to perform functionality for detecting the occurrence of complex events on a network, the functionality comprising:

monitoring a legacy network using a head end node and a plurality of capture nodes each of which is operatively connected to the head end node, the head end node including computer hardware for performing central configuration control of the plurality of capture nodes;

transmitting configuration instructions from the head end node to each capture node to specify what simple event reports are to be generated by the capture nodes and in response to what conditions detected on the monitored computer network;

transmitting to the head end node configuration instructions from a user of the system;

processing these configuration instructions; and sending them to a specified capture node for causing the node to operate in accordance with the specified configuration instructions; wherein:

the capture nodes monitor the computer network to generate simple event reports in response to the result of monitoring the network and pass these to a complex event processing engine associated with the head end node for processing to identify the occurrence of complex events based on the received simple event reports; and one or more of the capture nodes is configurable into a plurality of different configurations including a non-invasive mode of operation configuration and an invasive or minimally invasive mode of operation configuration.

9. The transitory machine readable storage medium according to claim 8, the functionality further comprising inferring the occurrence of complex conditions based on the detection of combinations of occurrences of plural simple events, the occurrence of each simple event being detectable based on the data captured by a single capture node.

10. The transitory machine readable storage medium according to claim 9, the functionality further comprising detecting the occurrence of complex conditions which are not detectable solely on the basis of the data captured by a single capture node, or which are only detectable based on data captured by a single capture node using statistical analysis over a time period.

11. The transitory machine readable storage medium according to claim 8, wherein each capture node is a generic node capable of being configured into one of the following specific types of capture node: a network sniffer operable to extract information from packets of data flowing on a network or a log picker operable to extract information from log files.

12. The transitory machine readable storage medium according to claim 8, wherein the capture nodes and the head end node include a heartbeat mechanism whereby each active deployed capture node periodically communicates with the head end node even where no simple event occurrences have been detected by the capture node, to provide a level of assurance to the head end node that the capture node is still operating correctly.

13. The transitory machine readable storage medium according to claim 8, wherein the head end node is configured to receive registration requests by external components whereby any external component which registers with the head end node for notification of the occurrence of a particular complex event as detected by the complex event processing engine, is notified by the head end node whenever such an occurrence is actually detected by the CEP engine.

* * * * *